United States Patent Office 2,709,327
Patented May 31, 1955

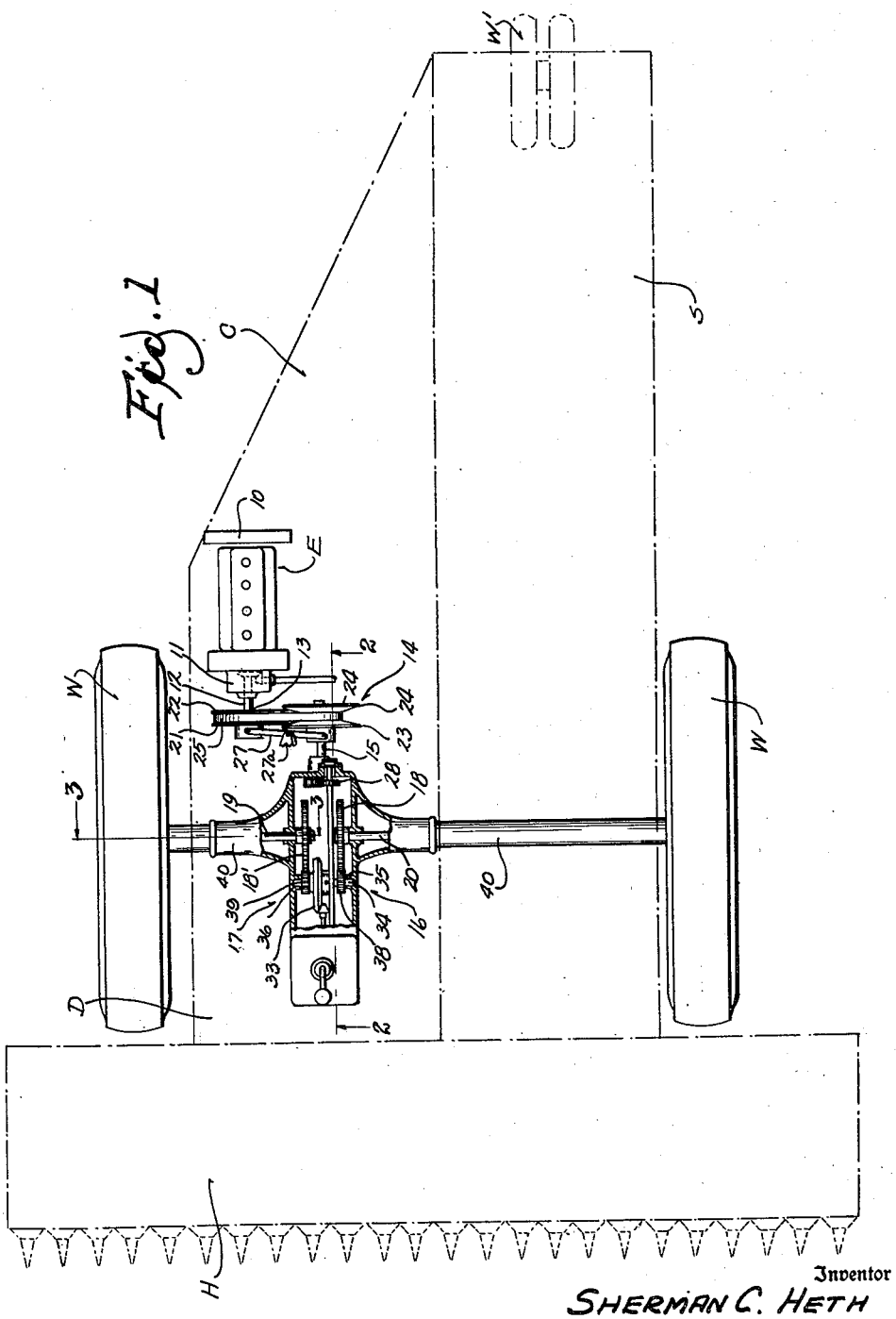

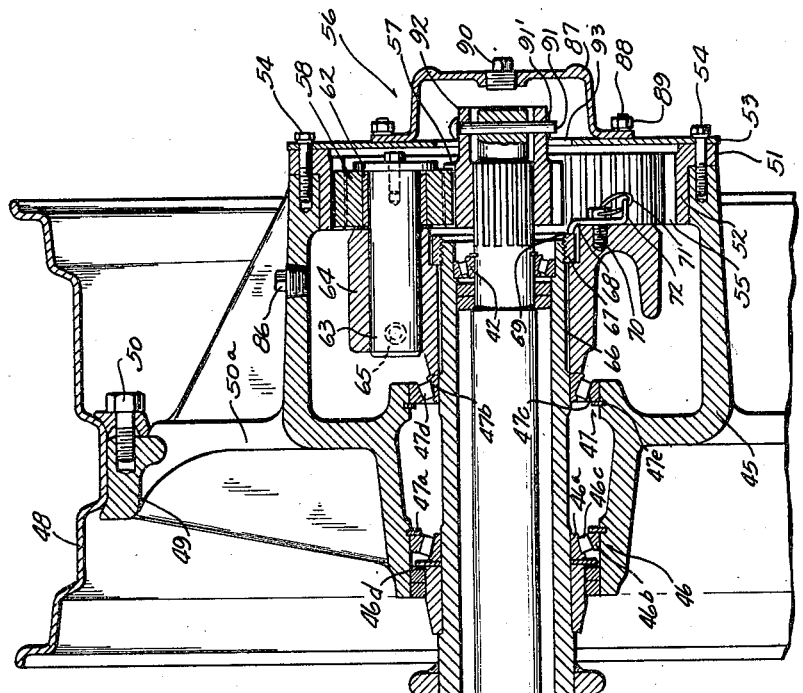

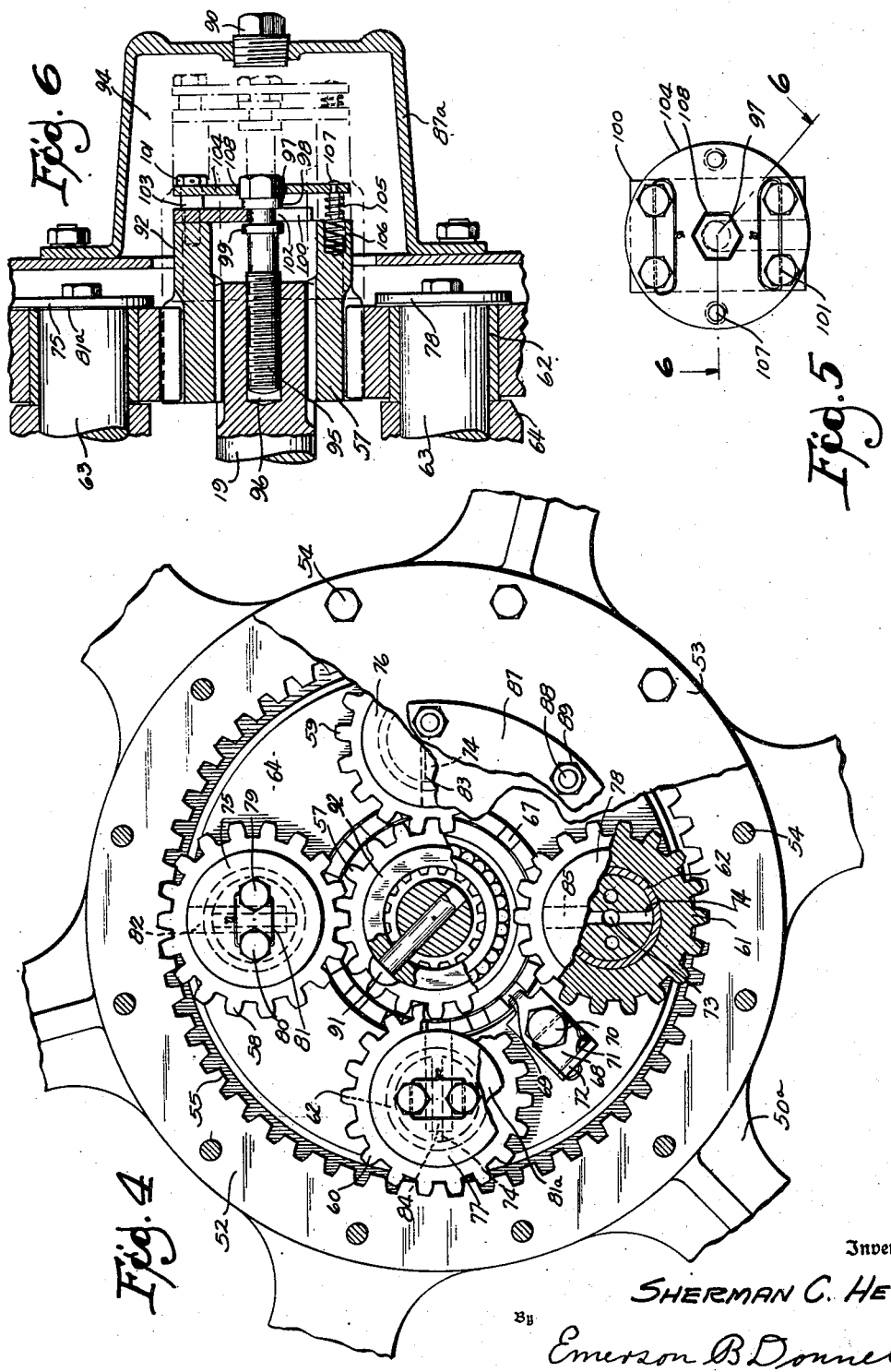

2,709,327

REDUCTION GEARING TRANSMISSIONS FOR SELF-PROPELLED COMBINES

Sherman C. Heth, Racine, Wis., assignor to J. I. Case Company, Racine, Wis., a corporation of Wisconsin Application February 25, 1950, Serial No. 146,327

5 Claims. (Cl. 56—21)

The present invention relates to a driving axle construction for a self-propelled combine, and more particularly to novel features of design and construction which are associated particularly with the hub portion thereof.

The main objects of the invention are to provide a driving axle for a self-propelled combine which is more compact and of sturdier construction than driving axles of prior self-propelled combines; to provide a driving axle in which the driving torque is distributed over a toothed gear surface in the wheel hub thereby protecting the axle shaft from danger of breakage due to excess torsional strain; to provide a reduction system in the wheel hubs of the traction wheels whereby the full speed of the engine may be used without excessive speed of the combine; to provide an extreme reduction for very slow forward travel at normal engine speeds without liability of inadvertent development of excessive torque in the transmission parts, axle shafts, or both; to provide a novel reduction transmission device for a self-propelled combine which may be readily assembled from a standard tractor rear axle and transmission parts which are in continual production thereby substantially decreasing the cost and improving the quality of this reduction system for self-propelled combines and ensuring the users of an ample supply of spare parts at all times; and to provide a free-wheeling means whereby the reduction system in the wheel hubs of the self-propelled combine may be disengaged thereby allowing the combine to be pulled at high speeds while in transport without excessive speed-ups of the transmission parts.

The axle of a self-propelled combine embodying the preferred form of my invention is shown in the accompanying drawings, in which:

Fig. 1 is a diagrammatic plan view of a self-propelled combine with parts broken away and in section, embodying the present invention.

Fig. 2 is an enlarged vertical section view taken on the line 2—2 of Fig. 1 with parts removed.

Fig. 3 is an enlarged vertical section view taken on the line 3—3 of Fig. 1 with parts removed.

Fig. 4 is a further enlarged right end elevation of the structure shown in Fig. 3 with parts broken away to show the reduction gearing mechanism.

Fig. 5 is a right end elevation of a structure similar to that shown in Fig. 3 with parts removed showing a modified construction.

Fig. 6 is a horizontal section view of such modification taken on the line 6—6 of Fig. 5.

Referring to the drawings, Fig. 1 shows a self-propelled combine in which a main frame or chassis C is supported on its forward end by power driven ground wheels W while at its rearward end it is supported by a pair of steering wheels W'. Secured to said main frame and supported by means of a vertical frame, not shown, is a separating and threshing machine S. A header H is adjustably supported on forward posts D and is equipped with a reel, a sickle, a header auger, and a feed rake, all of which may be of any suitable or well-known type not shown in the drawings. An internal combustion engine E suitably supported on the machine in any well-known manner forming no part of the invention is provided for propelling the machine and for driving the instrumentalities, not shown, of the header H and of the separator and threshing machine S, and is supplied with the usual well-known accessories not shown in the drawings.

The internal combustion engine E positioned as shown in Fig. 1 is provided rearwardly with a radiator 10 and forwardly with a fly wheel housing 11. An extension shaft 12 protrudes forwardly from the fly wheel housing 11 of the engine E. The end 13 of the shaft 12 is operatively interconnected with and drives a variable speed belt and pulley transmission generally designated as 14 of a type employing expansible cone-like pulleys and a co-operable V-belt of the edge active type. The belt and pulley gearing 14 in turn drives the input shaft 15 of a variable speed transmission, generally designated as 16. The transmission 16 acts through a differential 17 and final drive gears 18 and 18' to drive aligned front axle shafts 19 and 20 respectively which in turn drive wheel supporting hubs 45, on which the wheels W are secured, through a reduction gearing mechanism 56.

The belt and pulley gearing 14 comprises upper V driving pulley members 21 and 22, lower V driven pulley members 23 and 24 and an edge active V-belt 25. The members 21 and 22 are preferably splined on the portion 13 of the shaft 12 so that the cone-like discs are rotatively fixed relatively to the shaft 12. The members 23 and 24 are preferably splined on the input shaft 15 of the transmission 16 and also have cone-like disc portions rotatively fixed with the input shaft 15.

A shifter lever 27 of any suitable construction, shown only diagrammatically and of no detailed significance as far as the present invention is concerned, is operatively associated with the belt and pulley gearing 14 so that the rotation of members 23 and 24, on the input shaft 15 can be regulated. This is accomplished in a generally well-known manner by shifting the members along their respective shafts so that the V-belt will travel at a greater radius on one pulley than on the other. Shifter 27 is fulcrumed at 27ᵃ on a fixed part of the structure and by a rocking movement can force one pair of members 21 and 22 or 23 and 24 together while shifting the others apart. Belt 25 will then travel at a comparatively long radius on the closely spaced members and at a comparatively short radius on the more widely spaced members. Suitable well-known means is provided for so moving shifter 27.

As shown in Fig. 1 and as previously mentioned, the driven pulley members 23 and 24 are splined on the input shaft 15 of the selective variable speed transmission 16. Reduction gearing 28, Fig. 2, transmits the power from the input shaft 15 to a main drive shaft 29 of the transmission. The transmission includes standard change speed gears 30 controllable by a gear shift lever 31 and also has a pinion 32 meshing with and driving a ring gear 33 of the differential 17.

The differential 17 in the present instance includes the ring gear 33 carried on a transverse shaft 34 mounted in aligned bearings 35 and 36, Fig. 1, of a differential housing 37 of the differential 17. Laterally of the differential ring gear 33 on the transverse shaft 34 are a pair of spur gears 38 and 39 which intermesh with the final drive gears 18' and 18 of the aligned front axle shafts 19 and 20 respectively, and which are driven from ring gear 33 through the differential mechanism in well-known manner.

Referring to Figs. 1 and 3 the front axle construction of the present invention comprises tubular axle housings 40 with the aligned axle shafts 19 and 20 journaled in the axle housing on anti-friction bearings 41 and 42. Since the aligned axle shafts 19 and 20 and their associated parts are substantially identical, one to the other, the following description is in regard to the right hand section of the axle construction as disclosed in Fig. 3, and will apply equally well to the left hand section. The axle shaft 19 is suitably formed on its adjacent end as at 43 to accommodate the final drive gear 18', which as already noted is intermeshed with the spur gear 39 of the transverse shaft 34. A lock nut 44 is threaded on the adjacent end thereby securing the final drive gear 18 in its aligned position to intermesh with the spur gear 38.

A wheel supporting hub 45 having a hollow interior and embodying a final reduction gear as stated, is mounted on anti-friction bearings generally designated as 46 and 47 on the axle housing 40 to provide for its rotation relatively thereto, bearing 46 comprises an inner race 46ᵃ, an outer race 46ᵇ, and a plurality of anti-friction rolling elements 46ᶜ, preferably of a character which provides for adjustment of the clearance between the rolling elements and the races by relative axial movement between the races. Tapered rollers are known to be well-adapted for this type of adjustment but other types of rolling elements are also adjustable in this manner and contemplated as equivalent. Race 46ᵃ is suitably fitted on axle housing 40, axial movement of the race to the left as seen in Fig. 3 being prevented by means of a lock ring 46ᵈ. Race 46ᵇ is carried in hub 45 and held against axial displacement to the right in Fig. 3 by means of a lock ring 47ᵃ. Axial movement of hub 45 to the left will accordingly cause appropriate axial displacement of races 46ᵃ and 46ᵇ in the illustrative construction to eliminate slack or lost motion between the races and rolling elements 46ᶜ.

Bearing 47 comprises inner and outer races 47ᵇ and 47ᶜ with anti-friction rolling elements 47ᵈ interposed as described in connection with bearing 46. Outer race 47ᶜ is carried in hub 45 and retained against axial displacement to the left as seen in Fig. 3 by means of a ring 47ᵉ while race 47ᵇ is slidable on axle housing 40 and retained against displacement to the right in Fig. 3 by means of a reduction gear supporting spider or carrier to be described presently. It will now be apparent that adjustment of race 47ᵇ to the left in Fig. 3 will remove any slack in bearing 47 while further adjustment will urge bearing 47 to the left and in turn remove any slack in bearing 46. A wheel rim 48 of any desired conventional type is secured to a flange 49 of the wheel supporting hub 45 as by bolts or other suitable fastening means 50, flange 49 being connected with hub 45 by spokes or the like 50ᵃ.

Laterally the wheel supporting hub 45 has secured thereto a flange 51 of an internal ring gear 52 and a protective plate 53 as by bolts or any other suitable fastening means 54. The ring gear 52 has internal teeth 55 disposed inside the hub 45 and extending toward the axle shaft 19. Driving torque is transmitted through a reduction gearing mechanism generally designated as 56 from the axle shaft 19 to the wheel supporting hub 45 and thence to the driving wheel W. Said reduction gearing mechanism 56 comprises a spur gear 57 splined or otherwise slidably but non-rotatably connected to the end of the axle shaft 19 which gear 57 is in mesh with four intermediate gears 58, 59, 60 and 61. The intermediate gears 58, 59, 60 and 61 are preferably provided with bushings 62 which are journalled on stud shafts 63 which in turn are non-rotatably secured to or in a spider 64 and prevented from being displaced as by bolts or other suitable means 65, said gears being thus positioned so as to intermesh with the internal teeth 55 of the ring gear 52 and also with the external teeth of gear 57. The spider 64 is non-rotatably mounted and in the present instance splined on the tubular axle housing 40 as at 66 adjacent the end of the axle housing 40 and prevented from moving axially on the splined portion 66 of the axle housing 40 by the anti-friction bearing 47 and a lock ring 67 threaded to the end of the axle housing 40. To prevent the end of the lock ring 67 from working itself off the threaded portion of the axle housing, a lock clamp 68 is fitted into recesses 69 formed in the ring 67 and secured as by bolts or other suitable means 70 to the lateral surface of the spider 64 as best seen in Fig. 3. A lock wire or any other suitable means 71 is passed through an opening formed in the head of the bolt 70 and passes through a hole formed in the lateral flange 72 of the lock clamp 68, thereby preventing the bolt 70 from unthreading itself from the spider 65. As previously suggested in the description in regard to the bearing 46 and 47, the spider 64, which prevents displacement to the right, Fig. 3 of the race 47ᵇ can be moved to the left by turning the lock ring 67 in the correct direction on the threaded portion of the axle housing so that the adjustment of the race 47ᵇ to the left in Fig. 3 will remove any slack in bearing 47 while further adjustment will urge the bearing to the left and in turn remove any slack in bearing 46. If the bearings 46 and 47 are too tight, the lock ring should be turned in the opposite direction so as to allow the spider 64 to move to the right in Fig. 3 the required distance as should be clear. When the correct adjustment for the bearing 46 and 47 is found, the lock ring 67 is locked as to movement by means of the lock clamp 68 as previously pointed out above. It should be clear that with the construction as just described, the intermediate gears 58, 59, 60 and 61 are allowed to rotate relative to the spider 64, while the spider 64 is held against rotation with the axle shaft 19 by its above described engagement with the axle housing 40. It will also be apparent that rotation of the axle shaft 19 will rotate gears 58, 59, 60 and 61, and that, because of this the wheel hub 45 will be rotated in the opposite direction by means of the intermediate gears 58, 59, 60 and 61, the speed of rotation of the wheel hub 45 being reduced with respect to the speed of rotation of the axle shaft 19 an amount in proportion to the difference in diameter and number of teeth between the ring gear 52 and the spur gear 57.

To insure unfailing lubrication of the bushings 62 a hole or duct 73 is drilled or otherwise formed axially in each of the stud shafts 63 which acts as a lubricant duct. Radiating from the holes 73 are passageways 74 which terminate at the bushings 62. As can be seen clearly in Fig. 4, the passageways 74 of the stud shafts 63 lie substantially in a plane through the axis of the stud shafts 63 and the center of the axle shaft 19. Caps 75, 76, 77 and 78 are secured to the ends of the stud shafts 63 by means of bolts or other suitable fastening means, 79 and 80. Bolts 79 and 80 are locked by means of a wire bolt lock 81 to prevent rotation, and a washer 81ᵃ is positioned between each of the rotatable intermediate gears 58, 59, 60 and 61 and the caps 75, 76, 77 and 78 respectively. Oil ducts 82, 83, 84 and 85 are formed in the caps 75, 76, 77 and 78 respectively, and lead from the periphery thereof toward the axes of the stud shafts 63, emptying into the lubricating ducts 73.

It will be noticed in Fig. 4 that the intermediate gears 58, 59, 60 and 61 are rotatably positioned about the gear 57 so that the axes of the gears 59 and 60 lie substantially in a plane parallel to the horizontal through the axis of the axle shaft 19, while the axes of the gears 58 and 61 lie in a plane substantially normal to the horizontal through the axis of the axle shaft 19, the gear 58 being above the spur gear 57 while the gear 61 is below the spur gear 57. It will be further noticed in Fig. 4 that the ducts 82, 83, 84 and 85 lie substantially in a plane through the axes of the stud shafts 63 and the center of the axle shafts 19, the duct 82 opening on the periphery of the cap 75 facing the internal ring gear 52, and the ducts 83, 84, and 85 opening on the periphery of the caps 76, 77 and 78 respectively facing the spur gear 57. The rotation of the wheel supporting hub 45, by reason of rotation of the internal ring gear 52, carries the lubricant upwardly and deposits it into the opening of the duct 82 when the intermediate gear 58 intermeshes with the internal ring gear 52. The openings of the ducts 83, 84 and 85 are below the level of the lubricant which through the action of gravity will seek a predetermined level, which is preferably chosen somewhat above the centers of shaft 19, and gears 59 and 60. The lubricant travels through the ducts 82, 83, 84 and 85, into the ducts 73 and along the passageways 74 onto the bushings 62. A plug 86 is threaded into the wheel supporting hub 45 to enable the user to drain or add the required amount of lubricant. The lubricant can be drained by stopping the combine with the plug at its lowest point, and removing the same and a predetermined level of lubricant attained by running until the plug is at the desired level, removing the plug, filling to the opening, and replacing the plug.

The end of the axle shaft 19 is protected from dirt and the elements by means of a hub cap 87 secured to protruding studs 88 of the protective plate 53 as by nuts or other suitable fastening means 89. A plug 90 is threaded into the hub cap 87 to enable the operator to check the amount of lubricant in the hollow interior of the supporting hub 45.

Since the speed of this self-propelled combine has been decreased so greatly by reason of the auxiliary reduction gear just described, as compared for example with arrangements in which the wheels are fixed directly on shafts such as the present shafts 19 and 20, it is advantageous, in the event the user should desire to transport the machine any great distance, to pull the machine by a tractor or other vehicle instead of running the machine under its own power. This is so because extreme reduction from the speed of shaft 15 to that of wheels W—W would result in an equally extreme speed-up of the gears 30 and 28 when the machine is being pulled by an outside power source. Any substantial road speed would result in such high rates of rotation in these parts as to impair the lubrication and damage the same. To enable the wheel hub 45 to be rotated at substantial speed without damaging the reduction gearing mechanism 56, a locking pin or the like 91 is insertable through aligned holes formed in the axle shaft 19 and a hub portion 92 of the spur gear 57 and locked in position by a cotter pin or the like 91'. By removing the pin 91 which is easily accessible by removal of the hub cap 87 the spur gear 57 can be pulled off the splined portion of the axle shaft 19 through an opening 93 formed in the plate 53, thereby disengaging the wheel hub from the reduction gearing mechanism 56 and allowing the self-propelled combine to be drawn at high speeds without driving shaft 19, thus avoiding damage to the reduction gearing mechanism. As will be apparent, the only gearing then in operation will be the internal gear 52 and gears 58, 59, 60 and 61, and the speeds of these would not be excessive, even at high road speeds.

Figs. 5 and 6 show a modified free wheeling means 94 for disengaging the spur gear or driving element 57 from the teeth of the intermediate gears 58, 59, 60 and 61 without removing the hub cap 87 from the wheel hub 45, where the parts are identical with the embodiments of Figs. 1 to 4, the same reference characters being used, corresponding but modified parts receiving the same number with the exponent "a". As disclosed, in the present instance, the free wheeling means 94 comprises a bolt 95 accommodated in an axially tapped hole 96 formed in the end of the axle shaft 19. The bolt 95 has a head 97 of hexagonal or other suitable irregular form and an enlargement providing a shoulder 98 formed adjacent the head 97. Bolt 95 also has a shoulder 99 formed slightly remote from the shoulder 98. A plate 100 is secured to the end of the hub portion 92 of the spur gear 57 as by bolts 101 threaded into hub portion 92. The plate 100 has formed therein a hole 102 so as to accommodate the bolt 95 slidably therein, the shoulder 99 being adjacent the inner surface of the plate 100 while the shoulder 98 is adjacent the outer surface of the plate 100. It should be apparent from the foregoing disclosure that when the bolt 95 is unscrewed from the tapped hole 96 of the shaft 19, the bolt 95 will be moved outwardly until the shoulder 99 presses against the plate 100. If the unscrewing of the bolt 95 is continued, the shoulder 99 will exert a force against the plate 100 moving the plate 100, and consequently the spur gear 57, a distance laterally equal to the distance moved by the bolt 95. The bolt 95 can be unscrewed from the shaft 19 until the teeth of the spur gear 57 are out of mesh with the teeth of the intermediate gears 58, 59, 60 and 61, disengaging thereby the wheel hubs 45 from the reduction gearing mechanism 56. If the operator desires to reengage the reduction gearing mechanism 56 with the wheel hubs 45 the bolt 95 is screwed into the shaft 19, the shoulder 98 of the bolt 95 pressing against the plate 100 thereby moving the spur gear 57 inwardly a distance equal to that moved by the bolt 95 in the tapped hole 96 of the shaft 19.

To prevent the bolt 95 from turning in the tapped hole 96 when such turning is not desired a locking means or piece is provided which will now be described. The bolts 101, which as previously mentioned secure the plate 100 to the end of the spur gear 57, have formed thereon enlargements 103 adjacent the heads of the bolts 101 so as to space the heads of the bolts 101 outwardly from the plate 100 while still maintaining the plate 100 securely fastened to spur gear 57. The locking means 102 comprises a disk 104 slidably positioned between the plate 100 and the heads of the bolts 101 on the enlargements 103, and yieldably maintained against the heads of the bolts 101 as by springs 105. As seen the springs 105 are seated in holes 106 formed in the end of the spur gear 57 and are compressed by the disk 104 so as to constantly exert an outward force against the disk 104. The springs 105 are maintained in position with respect to the disk 104 by guides 107 secured with the disk 104 and extending into the springs 105. The disk 104 has axially formed therein a hexagonal hole 108 slightly larger than the head 97 of the bolt 95 so as to accommodate therein the head 97 of the bolt 95 when said head registers with the hexagonal hole 108 formed in the disk, it being recognized that a plane through the disk 104 intersects the head 97 of the bolt 95 when the disk 104 is maintained against the heads of the bolts 101 by the springs 105. It will now be apparent that the hexagonal hole 108 formed in the disk 104, while being enough larger than the head 97 of the bolt 95 to accommodate the head therein is enough similar in size to the size of the head 97 of the bolt 95 to prevent the bolt 95 from turning in the tapped portion of the shaft 19. It will be understood that other angular or irregular shapes are contemplated for the head 97 and the hole 108 within the scope of the invention, so long as it is impossible for the head 97 to turn when positioned within hole 108 except with plate 104.

Since as previously mentioned the spur gear 57 does not have to be removed from the shaft 19, the hub cap 87 of the first embodiment has been replaced by a hub cap 87ª. As seen in Fig. 6, the hub cap 87ª extends outwardly from the end of the shaft 19 sufficiently to accommodate spur gear 87 when the gear is out of mesh with the intermediate gears 58, 59, 60 and 61. As in Fig. 3, the oil plug 90 is retained in the hub cap 87ª, the axis of the plug 90 lying substantially along the axis of the shaft 19. In the operation of this free wheeling device, when the operator wishes to disengage the spur gear from the intermediate gears so as to permit the wheel hubs to rotate freely, he merely has to remove the oil plug 90 and insert a socket wrench or any like instrument or tool into the interior of the hub cap 87 so as to grip the hexagonal head 97 of bolt 95. By pushing inwardly with the socket wrench the disk 104 is pushed inwardly, thereby freeing the head of the bolt 95 from the disk 104. The bolt 95 can then be unscrewed from the tapped hole 96 pulling thereby the spur gear 57 from the shaft 19 until the gear 57 is out of mesh with the intermediate gears as previously described. When the socket wrench is removed from the head 97 of the bolt 95 the springs 105 will move the disk 104 outwardly until the disk 104 is maintained against the heads of the bolts 101 or against the head 97 until the head 97 of the bolt 95 registers with the irregular hole 108 formed in the disk 104 whereupon the pressure of springs 105 will press plate 104 outwardly into the position of Fig. 6, again locking bolt 95 against undesired movement. To reengage the reduction system, the same procedure is followed except that the bolt 95 is screwed into the tapped portion of the shaft 19 thus moving the gear 57 axially inwardly as already described, care being taken to insure that the teeth of gear 57 pass between so as to properly mesh with those of intermediate gears 58, 59, 60 and 61.

While I have illustrated and described a preferred embodiment of my invention, many modifications may be made without departing from the spirit of the invention, and I do not wish to be limited to the precise details set forth, but desire to avail myself of all changes within the scope of the appended claims.

Having thus described my invention, what I claim as new and desire to secure by Letters Patent of the United States is:

1. In a self-propelled harvester-thresher having ground wheels, and a prime mover on said thresher, drive connections between said prime mover and said ground wheels, said drive connections to said ground wheels comprising an axle including an axle tube, a hub having a sleeve portion journaled on said axle tube at a point spaced inwardly from the end thereof, first bearing means in said sleeve portion slidably engaged with said tube inwardly of the end thereof, second bearing means in said sleeve portion spaced inwardly of the first bearing means, engaged with said tube and secured against axial movement thereon, a driving axle in said tube extending beyond the end thereof into said hub, a driving gear on said axle beyond the end of said tube a gear support or carrier slidably but nonrotatively mounted on said tube between the end thereof and said first bearing, an idler gear journaled on said gear support and meshed with said driving gear, an internal gear in said hub meshed with said idler gear, and means on said tube between said gear carrier and the end of said tube adapted to urge said carrier toward said first bearing, said carrier and said first bearing having interengaging portions, whereby adjustment of said means, through sliding of said carrier will adjust said bearing.

2. In a self-propelled harvester-thresher having ground wheels, and a prime mover on said thresher, drive connections between said prime mover and said ground wheels, said drive connections to said ground wheels comprising an axle including an axle tube, a hub having a portion journaled on said axle tube at a point spaced inwardly from the end thereof, first bearing means in said portion slidably engaged with said tube inwardly of the end thereof, second bearing means in said portion spaced inwardly of the first bearing means, engaged with said tube and secured against axial movement thereon, a driving axle in said tube extending beyond the end thereof into said hub, a driving gear on said axle beyond the end of said tube, a gear support or carrier slidably but nonrotatively mounted on said tube between the end thereof and said first bearing, an idler gear journaled on said gear support and meshed with said driving gear, an internal gear in said hub meshed with said idler gear, and means on said tube between said gear carrier and the end of said tube adapted to urge said carrier toward said first bearing, said carrier and said first bearing having interengaging portions, whereby adjustment of said means, through sliding of said carrier will adjust said bearings.

3. In a self-propelled harvester-thresher having ground wheels, and a prime mover on said thresher, drive connections between said prime mover and said ground wheels, said drive connections to said ground wheels comprising an axle including an axle tube, a hub having a portion journaled on said axle tube at a point spaced inwardly from the end thereof, bearing means in said portion engaged with said tube inwardly of the end thereof, a driving axle in said tube extending beyond the end thereof into said hub, a driving gear on said axle beyond the end of said tube, a gear support or carrier slidably but nonrotatively mounted on said tube between the end thereof and said bearing means, an idler gear journaled on said gear support and meshed with said driving gear, an internal gear in said hub meshed with said idler gear, and means on said tube between said gear carrier and the end of said tube adapted to urge said carrier toward said bearing means, said carrier and said bearing means having interengaging portions, whereby adjustment of said means, through sliding of said carrier will adjust said bearing means.

4. In a self-propelled harvester-thresher having ground wheels, and a prime mover on said thresher, drive connections between said prime mover and said ground wheels, said drive connections to said ground wheels comprising an axle including an axle tube, a hub having a portion journaled on said axle tube at a point spaced inwardly from the end thereof, bearing means in said portion engaged with said tube inwardly of the end thereof, a driving axle in said tube extending beyond the end thereof into said hub, a driving gear on said axle beyond the end of said tube, disengageable means securing said driving gear on said axle, a gear support or carrier slidably but nonrotatively mounted on said tube between the end thereof and said bearing means, an idler gear journaled on said gear support and meshed with said driving gear, an internal gear in said hub meshed with said idler gear, and means on said tube between said gear carrier and the end of said tube adapted to urge said carrier toward said bearing means, said carrier and said first bearing having interengaging portions, whereby adjustment of said means, through sliding of said carrier will adjust said bearing means.

5. In a self-propelled harvester-thresher having ground wheels, and a prime mover on said thresher, drive connections between said prime mover and said ground wheels, said drive connections to said ground wheels comprising an axle including an axle tube, a gear reduction hub having a portion journaled on said axle tube at a point spaced inwardly from the end thereof, first and second bearings engaged in said portion and with said tube inwardly of the end thereof, a driving axle in said tube extending beyond the end thereof into said hub, a driving gear on said axle beyond the end of said tube, a gear support on said tube between the end thereof and said first bearing, an idler gear journaled on said gear support and meshed with said driving gear, and an internal gear in said hub enclosing and meshed with said idler gear whereby to avoid the possibility of excessive development of torque in said driving axle by reason of large total speed reduction between said prime mover and said ground wheel.

References Cited in the file of this patent

UNITED STATES PATENTS

| Number | Name | Date |
|---|---|---|
| 152,280 | Dailey | June 23, 1874 |
| 1,366,325 | Perin | Jan. 18, 1921 |
| 1,380,583 | Parker | June 7, 1921 |
| 1,417,426 | Torbensen | May 23, 1922 |
| 2,266,283 | Spengler | Dec. 16, 1941 |
| 2,318,409 | Millard et al. | May 4, 1943 |
| 2,369,745 | Millard et al. | Feb. 20, 1945 |
| 2,386,917 | Thornton | Oct. 16, 1945 |
| 2,475,042 | McCloskey | July 5, 1949 |
| 2,543,811 | Snow et al. | Mar. 6, 1951 |